United States Patent [19]

Rubin

[11] Patent Number: 4,472,176
[45] Date of Patent: Sep. 18, 1984

[54] APPARATUS AND METHOD FOR THE PRODUCTION OF PURE HYDROGEN FROM A HYDROGEN-CONTAINING CRUDE GAS

[75] Inventor: Leonard R. Rubin, Short Hills, N.J.

[73] Assignee: Resource Systems, Inc., E. Hanover, N.J.

[21] Appl. No.: 519,084

[22] Filed: Aug. 1, 1983

[51] Int. Cl.³ .............................................. B01D 53/22
[52] U.S. Cl. ......................................... 55/16; 55/158
[58] Field of Search ............................... 55/16, 68, 158

[56] References Cited

U.S. PATENT DOCUMENTS

| | | | |
|---|---|---|---|
| 2,911,057 | 11/1959 | Green et al. | 55/16 X |
| 2,958,391 | 11/1960 | DeRosset | 55/16 |
| 3,019,853 | 2/1962 | Kohman et al. | 55/158 X |
| 3,022,858 | 2/1962 | Tillyer et al. | 55/16 |
| 3,241,293 | 3/1966 | Pfefferle | 55/16 |
| 3,247,648 | 4/1966 | McKinley | 55/16 |
| 3,279,154 | 10/1966 | Emerson et al. | 55/158 |
| 3,368,329 | 2/1968 | Eguchi et al. | 55/158 |
| 3,782,904 | 1/1974 | Fletcher | 55/16 X |
| 4,056,373 | 11/1977 | Rubin | 55/16 X |
| 4,422,859 | 12/1983 | McGee | 55/16 |

FOREIGN PATENT DOCUMENTS 969673  9/1964  United Kingdom ................... 55/16

Primary Examiner—Robert H. Spitzer
Attorney, Agent, or Firm—Jonathan Myers

[57] ABSTRACT

An apparatus and method are disclosed for the production of pure hydrogen-containing crude gas. The apparatus, in the event of an interruption in power, is easily and rapidly purged of hydrogen. The apparatus includes a passage defined at least in part by a palladium-containing wall, an inlet opening into the passage to permit hydrogen-containing crude gas to diffuse through the wall, a first outlet positioned on the opposite side of the palladium-containing wall from the inlet, to permit removal of pure hydrogen, the second outlet from the passage on the same side of the wall as the inlet to permit removal of bleed gas, means for heating the hydrogen-containing crude gas, means for automatically blocking flow of hydrogen-containing crude gas through the inlet if the power is interrupted, means for introducing flow of a purge gas to the inlet, automatically and only if the power is shut off, and, means communicating with the second outlet to permit bleed gas passing through to by-pass a manually set bleed valve in the event of a loss of power to rapidly remove the bleed gas.

12 Claims, 1 Drawing Figure

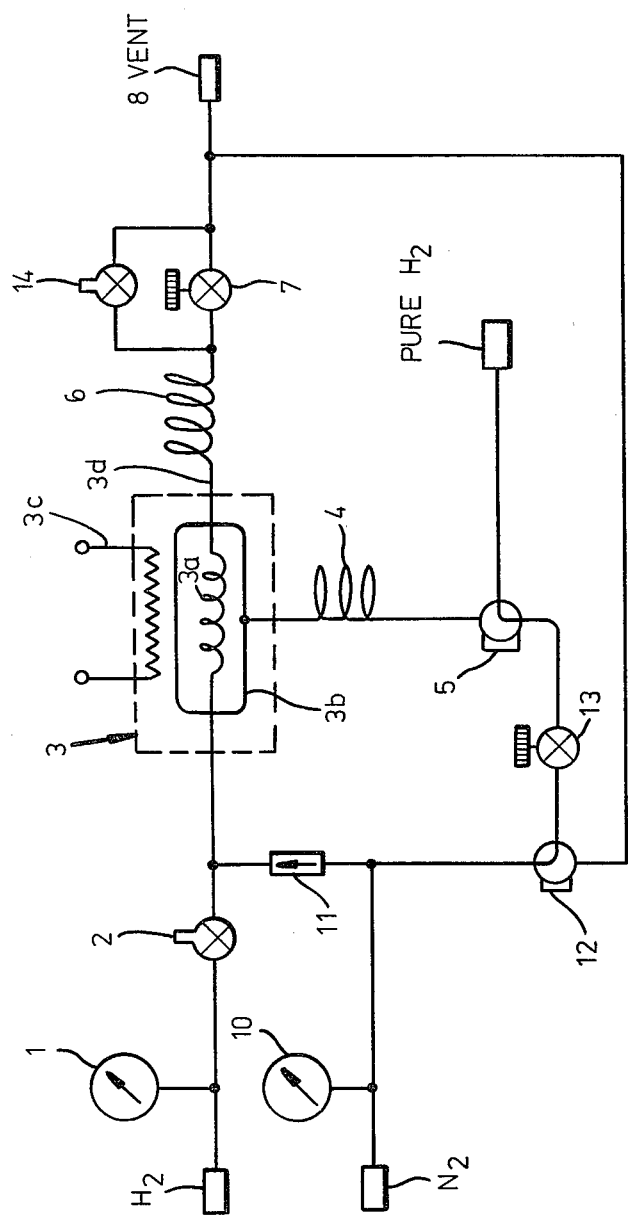

4,472,176

APPARATUS AND METHOD FOR THE PRODUCTION OF PURE HYDROGEN FROM A HYDROGEN-CONTAINING CRUDE GAS

FIELD OF THE INVENTION

This invention relates to the production of pure hydrogen from a hydrogen-containing crude gas. More particularly the invention relates to the production of hydrogen which has been purified by passage through a palladium-containing wall.

BACKGROUND OF THE INVENTION

The use of palladium and palladium-rich alloys for the separation of hydrogen from hydrogen-containing streams is well known. Equipment based on the permeation of hydrogen through pure palladium and later on through palladium-rich alloys has been sold commercially for at least twenty-five years and patents in this art go back to 1919.

It is a necessary characteristic of palladium and of all hydrogen permeation alloys that hydrogen dissolves into the bulk material. It is a characteristic of all practical permeation materials to date that the amount of hydrogen which dissolves into the material increases as the temperature decreases. It is another common characteristic that, as the amount of hydrogen in the metal increases, so does the spacing between metal atoms and so does the size of the bulk material. For practical reasons, permeation materials are used in thin section. Permeation rates are inversely proportional to barrier thickness and weights and associated precious metal costs are directly proportional to thickness. The permeation septa, generally in the form of tubing, are joined to massive structures which do not dissolve hydrogen in appreciable quantity, and which do not expand at low temperatures in the presence of hydrogen. For this reason, all current commercial hydrogen permeation equipment is subject to a destructive mismatch of expansion at the palladium alloy joint on cooling in the presence of hydrogen. Such destructive conditions can occur during long term power failure or because of faulty operating procedures.

It is a further characteristic of permeation barrier materials that hydrogen moves from a high hydrogen pressure on one side of the barrier to a lower hydrogen pressure on the other side of the barrier. It makes no difference to the permeation rate whether the far side of the barrier is under vacuum or has a high total pressure of non-permeable gas. As an example, hydrogen at one atmosphere will diffuse through a barrier into a volume which contains several psi or several thousand psi of nitrogen or argon. It will stop permeating through the barrier only when hydrogen pressures are equalized on both sides of the barrier.

OBJECT OF THE INVENTION

It is the object of the invention to protect the hydrogen diffusion apparatus from the destructive expansion mismatches which occur in the event of an interruption in the supply of power.

SUMMARY OF THE INVENTION

This object is obtained according to the present invention in an apparatus and method for the production of pure hydrogen from a hydrogen-containing crude gas, the apparatus in the event of an interruption in power, easily and rapidly purged of hydrogen.

The apparatus includes a passage defined at least in part by a palladium-containing wall. The palladium-containing wall may be palladium itself, or may instead be a palladium-rich alloy. In any event the palladium or the palladium-rich alloy both have the ability to allow hydrogen to selectively penetrate therethrough.

Structurally the passage defined at least in part by a palladium-containing wall is preferably a tube-in-shell reactor of the "inside-out" type. However, the passage defined at least in part by a palladium-containing wall may also be a tube-in-shell reactor of the "outside-in" type. Furthermore, any other type of palladium-containing vessel commonly used in the purification of hydrogen by selective permeation therethrough is within the scope of the invention.

The apparatus further includes an inlet which opens into the passage defined at least in part by the palladium-containing wall. The hydrogen-containing gas is led through the inlet into the passage and hydrogen selectively diffuses through the passage wall containing palladium. The selective diffusion of the hydrogen through the palladium takes place at temperatures above 600° F. The temperature is maintained by any conventional heating means such as an electrical heating coil.

Pure hydrogen is led away from the passage defined at least in part by a palladium-containing wall through a first outlet positioned on the opposite side of the palladium-containing wall as the inlet.

Bleed gas is led away from the passage defined at least in part by a palladium-containing wall through a second outlet positioned on the same side of the palladium-containing wall.

The apparatus is provided with means for automatically blocking the flow of the hydrogen-containing crude gas to the passage containing the palladium wall, only in the event of an interruption in the supply of power. A preferred blocking means is a solenoid valve normally closed in the event of a power interruption. As soon as there is a power interruption, the solenoid valve automatically closes. No additional hydrogen-containing crude gas will be permitted to enter the system.

Upon an interruption in the power supply and a stoppage of flow of hydrogen-containing crude gas to the passage defined at least in part by the palladium-containing wall, the pressure of the hydrogen will drop. At this time purge gas is permitted automatically to flow through the inlet and enter the passage defined at least in part by the palladium-containing wall. The purge gas is not able to flow through the inlet and enter the passage until the absolute pressure of the hydrogen drops below the absolute pressure of the purge gas e.g. nitrogen. The preferred and best means for controlling the flow of purge gas is a pressure-operated check valve.

A preferred feature of the invention employs a pressure-operated check valve having a predetermined cracking pressure substantially below the absolute pressure of the purge gas. Accordingly the absolute pressure of the hydrogen-containing crude gas will determine at what point purge gas is allowed to flow through the inlet and to enter the passage defined at least in part by a palladium-containing wall.

When power is interrupted and purge gas enters the inlet and the passage, it is very important to purge the system of hydrogen rapidly before cool-down. Otherwise the destructive expansion mismatches will occur. To aid in the rapid removal of hydrogen, the invention includes means for communicating with the second outlet to permit bleed gas passing through said second outlet to by-pass a manually set bleed valve, to rapidly remove the bleed gas. The means automatically is activated in the event of a power interruption, and is preferably a solenoid valve normally open in the event of a power interruption.

The apparatus further provides a first two-position valve communicating with the first outlet which connects the ultimate user's process for employing the purified hydrogen with the opposite side (pure side) of the passage defined at least in part by a palladium-containing wall, as well as with the source of purge gas. The first two-position valve gives the ultimate user of the pure hydrogen an added safety feature in that the source of pure hydrogen will be completely purged in the event of a power interruption. The two position valve normally closed to the flow of pure hydrogen and normally open to the flow of purge gas in the event of a power failure is preferably a 3-way solenoid valve or else is a pneumatic valve.

The apparatus still further provides a second two-position valve for selectively connecting the source of purge gas to said second outlet to a safe vent and to the user's process for the purified hydrogen. The two-position valve is preferably a 3-way solenoid valve.

The invention further provides a method for controlling the apparatus for the production of pure hydrogen, by passing a hydrogen-containing crude gas through a passage defined at least in part by a palladium-containing wall, from an inlet to an outlet, inducing hydrogen to diffuse through said wall into a space at elevated temperature and pressure, (600°–900° F., 15 to 250 psig) and withdrawing pure hydrogen from said space. The method includes the following steps:

automatically blocking flow of the hydrogen-containing crude gas to the inlet upon an interruption in the supply of power;

permitting the pressure in the passage to drop to a level at most equal to that of a source of purge gas; and automatically connecting said purge gas source to said inlet upon and solely as the result of the drop in pressure in said passage to the level whereby the purge gas transverses the passage.

Preferably the flow of hydrogen-containing crude gas to the inlet is effected by deenergizing a normally closed automatic valve.

Preferably the flow of bleed gas from the outlet is permitted by a manually set bleed valve while blocking a by-pass thereof with a normally open controlled valve. In the event of a power interruption, the normally open controlled valve is deenergized and purge gas is permitted to rapidly sweep therethrough removing any hydrogen left in the system.

It is a characteristic of the system described that not only is shutdown on loss of power safe, but that shutting off the power becomes the preferred method of closing down the system under non-emergency, everyday circumstances. Regular shutdown of conventional purifiers calls for a relatively complex system of operations including vacuum pumps or cyclic pressurization and depressurization of both sides of the system with inert gases. When power fails, conventional systems employing electrically driven vacuum pumps may be subject to hazards not only because of failure to remove hydrogen from the system, but also because of possible mixing of air with hydrogen or suck back of pump oils and vapors, if the power interruption occurs during evacuation.

BRIEF DESCRIPTION OF THE DRAWING

The sole FIGURE in this case is a flow diagram of a hydrogen diffusion cell setup with automatic valving to accomplish safe cooldown from operating temperature on loss of power.

DETAILED DESCRIPTION OF THE DRAWING

For the sake of this description, it is assumed that power is on and that the system is at operating temperature with raw hydrogen entering at 250 psig as measured by gauge 1 through normally closed solenoid valve 2 until the raw hydrogen reaches "inside-out" hydrogen diffuser 3. The hydrogen diffuser 3 contains palladium coil 3a, through which hydrogen is selectively diffused, a chamber 3b for receiving the purified hydrogen, a heating coil 3c for maintaining sufficient temperature to allow selective hydrogen diffusion through said palladium coil 3a and an outlet 3d to remove bleed gas from the inside of said palladium coil 3a.

Pure hydrogen escapes from the chamber 3b through a first cooling coil 4 and through a 3-way solenoid valve 5 to the user's process. A small amount of hydrogen containing all of the impurities is led from outlet 3d through a second cooling coil 6 and manually set metering valve 7 to a safe vent 8.

Nitrogen at 15 psig as measured by gauge 10 is connected to the purge inlet. Flow of nitrogen is blocked by check valve 11 and by a second 3-way solenoid valve 12. The line from the blocked normally open port of 3-way solenoid valve 5 is vented to the atmosphere through metering valve 13 and the normally closed port of 3-way solenoid valve 12. Pressures are given for example only. It is required only that the hydrogen pressure be greater than the purge gas pressure plus the cracking pressure of check valve 11. The purge gas need not be nitrogen so long as it contains no oxygen or hydrogen and is inert with respect to palladium coil 3a. Valves referred to as solenoid valves can be replaced with air or other gas operated valves so long as they are caused automatically to switch in an appropriate manner in the event of an interruption in power. These valves can also be spool valves, ball valves, or any other contrivance which performs the functions ascribed to solenoid valves 2, 5, 12 and 14.

On loss of power solenoid valve 2 falls shut, stopping the feed gas, and solenoid valve 14 opens, shunting manually set metering valve 7. 3-way solenoid valves 5 and 12 shuttle, closing off flow of pure hydrogen to the user's process and connecting the purge gas to metering valve 13. An appropriate amount of purge gas passes through 3-way solenoid valve 12, metering valve 13 and 3-way solenoid valve 5 to protect the user's system from possible hazards due to the loss of hydrogen flow. The pressure of the feed gas drops rapidly until it is equal to the purge gas pressure plus the cracking pressure of check valve 11. At this point purge gas starts to flow through hydrogen diffuser 3, through the second cooling coil 6, solenoid valve 14, and is vented through safe vent 8.

The passage of purge gas through the feed side of the system lowers the partial pressure of hydrogen to below 1 atmosphere. Hydrogen on the pure side of the palladium coil 3a back-diffuses therethrough into the purge stream where it is carried away to vent. Inasmuch as no new hydrogen is introduced into the system with the purge gas, the purge gas acts as a hydrogen pump and because the 3-way solenoid valve 5 is closed, the pure side of the system is evacuated (ie. stripped of hydrogen).

Turning the system back on requires that solenoid valve 2 be locked closed until a safe operating temperature is reached (>600° F.) and that 3-way solenoid valve 5 is not reset until hydrogen is present in the purge gas system at or above 1 atmosphere.

The system described uses the "inside-out" hydrogen diffuser as described in U.S. Pat. Nos. 3,274,754 and 4,056,373 both to Rubin. However, the system could also employ other palladium-containing diffusers such as those of the "outside-in" variety.

I claim:

1. A method of controlling an apparatus for the production of pure hydrogen by passing a hydrogen-containing crude gas through a passage defined at least in part by a palladium-containing wall, from an inlet to an outlet, inducing hydrogen at elevated temperature and pressure to diffuse through said wall into a receiving space, and withdrawing pure hydrogen from said space, said method comprising the steps of:
   (a) automatically blocking flow of said gas to said inlet upon an interruption of the supply of power to the apparatus;
   (b) permitting the pressure in said passage to drop to a level at most equal to that of a source of purge gas; and
   (c) automatically connecting said purge gas source to said inlet upon and solely as the result of the drop in pressure in said passage to said level whereby said purge gas transverses said passage.

2. The method defined in claim 1, step (a), wherein the blocking of flow of the gas to said inlet is effected by denergizing a normally closed automatic valve.

3. The method defined in claim 1, further comprising the step of:
   (d) permitting flow from said outlet through a manually set bleed valve while blocking a by-pass thereof with a normally open controlled valve, and deenergizing said by-pass valve in step (b).

4. An apparatus for the production of pure hydrogen from a hydrogen-containing crude gas, said apparatus in the event of an interruption in power, easily and rapidly purged of hydrogen, which comprises:
   (a) a passage defined at least in part by a palladium-containing wall;
   (b) an inlet opening into said passage permitting said hydrogen-containing crude gas to diffuse through said palladium-containing wall;
   (c) a first outlet positioned on the opposite side of the palladium-containing wall from said inlet, to permit removal of the pure hydrogen;
   (d) a second outlet from said passage on the same side of the palladium-containing wall as said inlet, to permit removal of bleed gas;
   (e) means for heating the hydrogen-containing gas to a temperature of at least 600° F.;
   (f) means for automatically blocking flow of hydrogen-containing crude gas through said inlet upon an interruption in the supply of power;
   (g) means for introducing flow of a purge gas to the inlet automatically and only in the event of an interruption of the supply of power; and
   (h) means communicating with said second outlet to permit bleed gas passing through said second outlet to by-pass a manually set bleed valve, in the event of an interruption of power, to rapidly remove the bleed gas.

5. The apparatus defined in claim 4 wherein the passage defined at least in part by a palladium-containing wall forms a tube-in-shell reactor of the inside-out type.

6. The apparatus defined in claim 4 wherein the passage defined at least in part by a palladium-containing wall forms a tube-in-shell reactor of the outside-in type.

7. The apparatus defined in claim 4 wherein the means for automatically blocking the flow of hydrogen-containing crude gas through said inlet upon an interruption in the supply of power is a solenoid valve normally closed in the event of an interruption in the supply of power.

8. The apparatus defined in claim 4 wherein the means for introducing flow of a purge gas to the inlet automatically and only in the event of an interruption in the supply of power is a pressure-operated check valve, said check valve permitting introduction of said purge gas only when the absolute pressure of the hydrogen-containing crude gas drops below the absolute pressure of the purge gas.

9. The apparatus defined in claim 8 wherein the pressure-operated check valve has a predetermined cracking pressure substantially below the absolute pressure of the purge gas.

10. The apparatus defined in claim 4 wherein the means communicating with the second outlet to by-pass the manually set bleed valve is a solenoid valve normally open in the event of an interruption in the supply of power.

11. The apparatus defined in claim 4 wherein said first outlet is provided with a first two-position valve connecting a process using the purified hydrogen with said opposite side of said palladium-containing wall and with a source of said purge gas.

12. The apparatus defined in claim 4, further comprising a second two-position valve for selectively connecting a source of said purge gas to said second outlet and to a process using the purified hydrogen.

* * * * *